US010104161B2

(12) United States Patent
Gittelman et al.

(10) Patent No.: US 10,104,161 B2
(45) Date of Patent: *Oct. 16, 2018

(54) MINIMAL DOWNLOAD AND SIMULATED PAGE NAVIGATION FEATURES

(71) Applicant: MICROSOFT TECHNOLOGY LICENSING, LLC, Redmond, WA (US)

(72) Inventors: Arye Gittelman, Mercer Island, WA (US); Petru Mihai Moldovanu, Redmond, WA (US); Sterling John Crockett, Bothell, WA (US); Patrick Carl Miller, Sammamish, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/182,153

(22) Filed: Feb. 17, 2014

(65) Prior Publication Data

US 2014/0164470 A1 Jun. 12, 2014

Related U.S. Application Data

(63) Continuation of application No. 13/310,991, filed on Dec. 5, 2011, now Pat. No. 8,700,691.

(51) Int. Cl.
*H04L 29/06* (2006.01)
*H04L 29/08* (2006.01)
*G06F 17/30* (2006.01)

(52) U.S. Cl.
CPC ........ *H04L 67/10* (2013.01); *G06F 17/30899* (2013.01); *H04L 67/02* (2013.01); *H04L 67/04* (2013.01)

(58) Field of Classification Search
CPC .... G06F 17/30899; H04L 67/02; H04L 67/04
See application file for complete search history.

(56) References Cited

U.S. PATENT DOCUMENTS 5,781,714 A * 7/1998 Collins ................. G06F 17/214
  345/471
6,396,500 B1   5/2002 Qureshi et al.
(Continued)

FOREIGN PATENT DOCUMENTS

CN       1682183 A    10/2005
CN       1979485 A     6/2007
CN     101689194 A     3/2010
(Continued)

OTHER PUBLICATIONS

Jason Lengstorf, "Pro PHP and jQuery", Jun. 22, 2010, Apress, p. 22, 73 and 79.*
(Continued)

*Primary Examiner* — Benjamin E Lanier
(74) *Attorney, Agent, or Firm* — Merchant & Gould

(57) ABSTRACT

Embodiments are provided that include client-server computing architectures that use minimal download features and functionality as part of page navigation operations, but are not so limited. In an embodiment, a client-server computer system uses a page transition strategy to navigate between electronic pages based in part on script, style, content, and/or other page differences that can be used as part of providing minimal download features and functionality. A method of an embodiment operates to package page incremental rendering information for use in rendering a new electronic page without having to reapply common aspects of the new electronic page and a reference electronic page. Other embodiments are also disclosed.

20 Claims, 9 Drawing Sheets

(56) References Cited

U.S. PATENT DOCUMENTS

| | | | |
|---|---|---|---|
| 6,691,176 B1* | 2/2004 | Narin | G06F 9/542 |
| | | | 707/E17.119 |
| 6,865,599 B2 | 3/2005 | Zhang | |
| 7,058,700 B1 | 6/2006 | Casalaina | |
| 7,185,063 B1* | 2/2007 | Kasriel | H04L 67/2814 |
| | | | 709/216 |
| 7,188,214 B1 | 3/2007 | Kasriel et al. | |
| 7,275,244 B1 | 9/2007 | Bell et al. | |
| 7,296,051 B1* | 11/2007 | Kasriel | G06F 17/30902 |
| | | | 707/999.01 |
| 7,392,325 B2 | 6/2008 | Grove et al. | |
| 7,434,163 B2 | 10/2008 | McKellar | |
| 7,487,261 B1* | 2/2009 | Kasriel | G06F 17/30902 |
| | | | 709/213 |
| 7,703,015 B2 | 4/2010 | McKellar et al. | |
| 7,765,274 B2 | 7/2010 | Kasriel et al. | |
| 7,831,556 B2 | 11/2010 | Behl et al. | |
| 7,904,432 B2 | 3/2011 | McKay et al. | |
| 8,271,333 B1* | 9/2012 | Grigsby | G06F 17/30017 |
| | | | 705/14.4 |
| 8,700,691 B2 | 4/2014 | Gittelman et al. | |
| 2002/0140729 A1 | 10/2002 | Price | |
| 2003/0135399 A1 | 7/2003 | Ahamparam | |
| 2003/0220944 A1* | 11/2003 | Lyman Schottland | G06F 8/68 |
| 2004/0139169 A1 | 7/2004 | O'Brien | |
| 2006/0020631 A1 | 1/2006 | Cheong Wan et al. | |
| 2006/0031379 A1 | 2/2006 | Kasriel et al. | |
| 2006/0036938 A1 | 2/2006 | Quaranta | |
| 2006/0212454 A1 | 9/2006 | Behl et al. | |
| 2007/0067418 A1* | 3/2007 | Isaacs | G06F 17/30893 |
| | | | 709/219 |
| 2007/0136415 A1 | 6/2007 | Behl et al. | |
| 2007/0300206 A1 | 12/2007 | Petrov | |
| 2008/0077653 A1 | 3/2008 | Morris | |
| 2008/0104256 A1 | 5/2008 | Olston | |
| 2008/0134014 A1 | 6/2008 | Hind et al. | |
| 2008/0228773 A1 | 9/2008 | Stewart et al. | |
| 2009/0007241 A1 | 1/2009 | Tewari et al. | |
| 2009/0015599 A1 | 1/2009 | Bennett et al. | |
| 2009/0080523 A1 | 3/2009 | McDowell | |
| 2009/0100228 A1* | 4/2009 | Lepeska | G06F 17/30902 |
| | | | 711/125 |
| 2009/0219829 A1 | 9/2009 | Merkey et al. | |
| 2009/0259552 A1* | 10/2009 | Chenard | G06Q 30/02 |
| | | | 705/14.72 |
| 2009/0259934 A1 | 10/2009 | Prisament | |
| 2009/0271778 A1 | 10/2009 | Mandyam | |
| 2009/0300709 A1 | 12/2009 | Chen | |
| 2009/0327510 A1 | 12/2009 | Edelman et al. | |
| 2010/0257413 A1 | 10/2010 | Brunet et al. | |
| 2011/0029641 A1 | 2/2011 | Fainberg et al. | |
| 2012/0016655 A1* | 1/2012 | Travieso | G06F 17/2827 |
| | | | 704/2 |
| 2012/0191840 A1 | 7/2012 | Gordon | |
| 2012/0239731 A1 | 9/2012 | Shyamsunder | |
| 2012/0317493 A1* | 12/2012 | Vilke | G06F 3/0487 |
| | | | 715/738 |
| 2013/0191435 A1 | 7/2013 | Gittelman et al. | |
| 2013/0191492 A1 | 7/2013 | Gittelman et al. | |

FOREIGN PATENT DOCUMENTS

| | | |
|---|---|---|
| EP | 1388783 A1 | 2/2004 |
| JP | 2002189618 A | 7/2002 |
| JP | 2002520735 A | 7/2002 |
| JP | 2004038439 A | 2/2004 |
| WO | 2011035944 A1 | 3/2011 |

OTHER PUBLICATIONS

Wahli, et al., "WebSphere Studio 5.1.2 JavaServer Faces and Service Data Objects", Published on: Jul. 2004, Available at: http://www.redbooks.ibm.com/redbooks/pdfs/sg246361.pdf.

"Updating Multiple Page Elements with Grails and Ajax", Published on: Jul. 20, 2009, Available at: http://weichhold.com/2009/07/20/updating-multiple-page-fragments-with-grails-and-ajax/, 5 pages.

Henson, Val, "An Analysis of Compare-by-hash" in Proceedings of the 9th Conference on Hot Topics in Operating Systems, vol. 9, 2003, 6 pages.

International Search Report and Written Opinion for PCT/US2012/066490 dated Feb. 19, 2013.

Kubica, Marek, "Howto Use Python in the Web", Retrieved on: Nov. 17, 2011, Available at: http://docs.python.org/howto/webservers.html#howto-use-python-in-the-web, 12 pages.

Mitchell, Scott, "Serving Dynamic Content with HTTP Handlers", Published on: Apr. 2004, Available at: http://msdn.microsoft.com/en-us/library/ms972953.aspx, 22 pages.

Muthitacharoen, et al., "A Low-bandwidth Network File System", in Proceedings of the Eighteenth ACM Symposium on Operating Systems Principles, Dec. 2001, pp. 174-187.

Naaman, et al., "Evaluation of ESI and Class-Based Delta Encoding", in Proceedings of the 8th International Workshop on Web Caching and Content Distribution, 2003, 12 pages.

Savant, et al., "Server-Friendly Delta Compression for Efficient Web Access", in Proceedings of the Eighth International Workshop on {Web} Content Caching and Distribution, Sep. 2003, 12 pages.

U.S. Appl. No. 13/353,963, filed Jan. 19, 2012 entitled Server-Side Minimal Download and Error Failover.

U.S. Appl. No. 13/354,164, filed Jan. 19, 2012 entitled Client-Side Minimal Download and Simulated Page Navigation Features.

Mesbah et al., "SPIAR: An architectural style for single page internet applications," Stichting Centrum voor Wiskunde en Informatica, Apr. 2006, ISSN 1386-369X, http://oai.cwi.nl/oai/asset/10866/10866D.pdf, 12 pages.

International Search Report and Written Opinion dated Apr. 25, 2013 in Application No. PCT/US2013/021612, 10 pages.

International Search Report and Written Opinion dated Apr. 30, 2013 in Application No. PCT/US2013/021613, 9 pages.

Chinese Office Action dated Dec. 1, 2014 in Application No. 201210514067.8, 18 pgs.

U.S. Office Action for U.S. Appl. No. 13/310,991 dated Mar. 15, 2013, 19 pgs.

Supplementary Search Report Received for European Patent Application No. 13738202.4, dated Jun. 18, 2015, 6 Pages.

"Second Office Action Issued in Chinese Patent Application No. 201210514067.8", dated Jul. 31, 2015, 6 Pages.

Mesbah et al., "Exposing the Hidden-Web Induced by Ajax"; Delft University of Technology, Software Engineering Research Group, Technocal Report Series, Jan. 7, 2008; © Copyright 2008; 14 pgs.

EP Communication dated Dec. 7, 2015 in Application No. PCT/US2013/021612, 10 pgs.

Lengstorf, "Pro PHP and jQuery", Jun. 22, 2010, Apress, 4 pgs.

U.S. Office Action for U.S. Appl. No. 13/353,963 dated Sep. 1, 2015, 43 pgs.

U.S. Office Action for U.S. Appl. No. 13/354,164 dated Oct. 15, 2015, 47 pgs.

Chinese 1st Office Action in Application 201380006055.7, dated Jul. 15, 2016, 12 pgs.

Lengstorf, Jason, "Pro PHP and jQuery", published 2010, Apress, pp. 22, 73 and 79, 8 pages total.

U.S. Appl. No. 13/354,164, Office Action dated Apr. 28, 2016, 29 pgs.

Chinese Notice on Grant dated Jan. 13, 2016 in Appln. No. 201210514067.8, 4 pgs.

Chinese Office Action and Search Report Issued in Chinese Patent Application No. 201380006024.1, dated Dec. 28, 2015, 11 Pages.

European Official Communication in Application 13738059.8, dated Jan. 4, 2016, 1 page.

European Official Communication in Application 13738202.4, dated Jul. 7, 2015, 1 page.

U.S. Office Action for U.S. Appl. No. 13/353,963 dated Feb. 11, 2016, 37 pgs.

U.S. Appl. No. 13/310,991 Notice of Allowance dated Nov. 15, 2013, 17 pgs.

(56) References Cited

OTHER PUBLICATIONS

U.S. Appl. No. 13/310,991 Notice of Allowance dated Jan. 13, 2014, 15 pgs.
U.S. Appl. No. 13/353,963 Office Action dated Mar. 24, 2017, 32 pgs.
Chinese Notice of Allowance in Application No. 201380006024.1, dated Sep. 7, 2016, 7 pgs.
"Office Action Issued in Chinese Patent Application No. 201380006055.7", dated Mar. 14, 2017, 13 Pages.
"Office Action Issued in Japanese Patent Application No. 2014-553349", dated Feb. 14, 2017, 8 Pages.
Shono, et al., "Efficient Dynamic Web Contents Delivery Method Utilizing Fingerprint", in the Journal of Information Processing Society of Japan, vol. 46, Issue 2, Feb. 15, 2005, pp. 570-584.
U.S. Appl. No. 13/353,963, Amendment and Response filed Jun. 21, 2017, 16 pages.
U.S. Appl. No. 13/354,164, Amendment and Response filed Jul. 7, 2017, 30 pgs.
U.S. Appl. No. 13/353,963, Notice of Allowance dated Aug. 11, 2017, 17 pages.
K. Psounis, "Class-based delta-encoding: a scalable scheme for caching dynamic Web content,", Proceedings 22nd InternationalConference on Distributed Computing Systems Workshops, 2002, pp. 799-805.
P. Ghosh and A. Rau-Chaplin, "Performance of Dynamic Web Page Generation for Database-driven Web Sites," International Conference on Next Generation Web Services Practices, Seoul, 2006, pp. 56-63.
S. Sulaiman, S. M. Shamsuddin and A. Abraham, "Intelligent Web caching using Adaptive Regression Trees, Splines, RandomForests and Tree Net," 2011 3rd Conference on Data Mining and Optimization (OMO), Putrajaya, 2011, pp. 108-114.
Xiangpai Qin and X. Zhou, "DB Facade: A Web Cache with Improved Data Freshness," 2009 Second International Symposium onElectronic Commerce and Security, Nanchang, 2009, pp. 483-487.
Chinese 3rd Office Action in Application 201380006055.7, dated Sep. 19, 2017, 18 pages.
U.S. Appl. No. 13/354,164, Office Action dated Jan. 29, 2018, 29 pgs.
"Office Action Issued in Japanese Patent Application No. 2014-553349", dated Oct. 30, 2017, 9 Pages.
"Fourth Office Action and Search Report Issued in Chinese Patent Application No. 201380006055.7", dated Apr. 4, 2018, 8 Pages.
"Notice of Allowance Issued in U.S. Appl. No. 13/354,164", dated Jul. 3, 2018, 11 Pages.
Skrupsky, et al., "WAVES: Automatic Synthesis of Client-Side Validation Code for Web Applications", In International Conference on Cyber Security, Dec. 14, 2012, pp. 46-53.
"Office Action Issued in European Patent Application No. 13738059.8", dated Jul. 18, 2018, 6 Pages.

\* cited by examiner

MINIMAL DOWNLOAD AND SIMULATED PAGE NAVIGATION FEATURES

CROSS REFERENCE TO RELATED APPLICATIONS

This application is a continuation of U.S. patent application Ser. No. 13/310,991, filed Dec. 5, 2011, and entitled "Minimal Download and Simulated Page Navigation Features," the disclosure of which is incorporated by reference herein in its entirety.

BACKGROUND

The computing age has dramatically affected the consumer knowledge base which, in turn, requires device and application providers to provide user-friendly and rich application functionality. Collaboration or content management systems provide a natural place to share ideas and information due in part to access and management abilities offered to multiple users, rich customization options, and a lightweight collaborative environment. However, a general problem pertains to reducing the amount of data sent to a web page during a navigation operation. One solution uses data compression and non-navigation operations, requiring a client to request specific data changes. Unfortunately, disadvantages of such a technique include: a) a complete rewrite of a web page, b) each individual part of a page may update separately, which can be very expensive and inefficient, and c) page changes are not recorded in a browser history such that the back and forward buttons or other navigation features do not operate as expected.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided that include client-server computing architectures that use minimal download features and functionality as part of page navigation operations, but are not so limited. In an embodiment, a client-server computer system uses a page transition strategy to navigate between electronic pages, such as web pages for example, based in part on script, style, content, and/or other page differences that can be used as part of providing minimal download features and functionality. A method of an embodiment operates to package page incremental rendering information for use in rendering a new electronic page without having to reapply common aspects of the new electronic page and a reference electronic page. Other embodiments are also disclosed.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Figure 1:
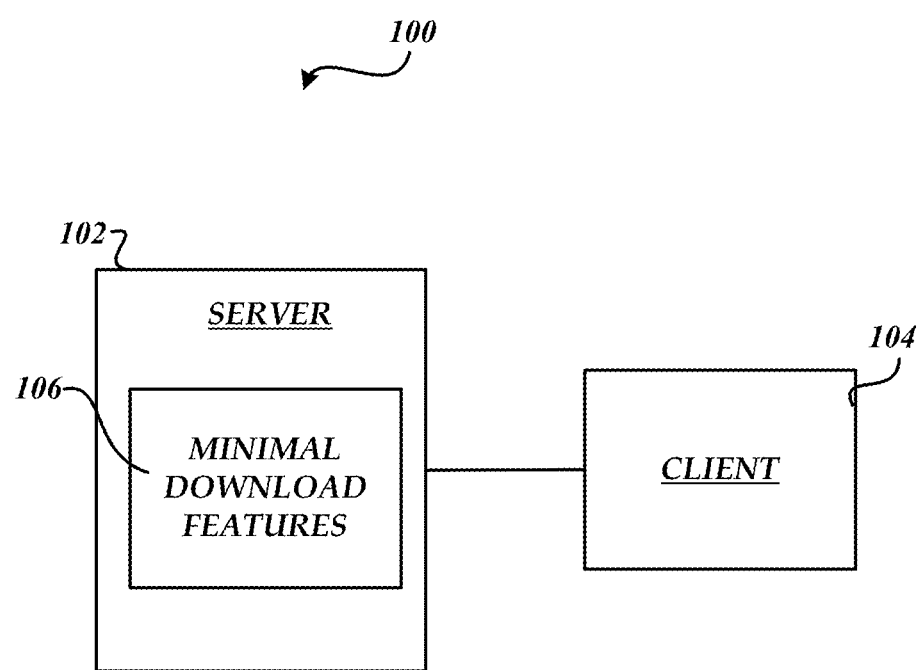
FIG. 1 is a block diagram of an exemplary computing environment.

FIG. 1 is a block diagram of an exemplary computing environment 100 that includes processing, memory, networking, and/or other components that provide electronic page navigation features and functionality, including minimal download page transitions, but is not so limited. As shown in FIG. 1, the exemplary computing environment 100 includes at least one server system or server 102 and at least one client 104 that are used as part of implementing a page navigation mechanism or process, but is not so limited. Those skilled in the art will recognize that a plurality of client devices/systems can be configured to communicate and/or interact with a number of servers and/or other components using available wireless and/or wired infrastructure and functionalities. For example, a user can use the client 104 as part of interacting with a computing device or system to access and use information and resources of a plurality of collaboration, web, file, and/or other servers as part of browsing electronic pages. It will be appreciated that during a typical interactive session, a user can use the client 104 to call on and access server information and/or services from a plurality of physical serving machines (e.g., web server, collaboration server, database server, etc.).

As described below, a minimal download technique determines differences between a user's current web page and a new requested web page, packaging determined differences for sending to a client for local difference application to update one or multiple areas of the requested web page on a screen/display. The technique can be applied to a class of existing webpages with minimal updating, so there is no need to rewrite entire suites of webpages. The server 102 of an embodiment includes minimal download features 106 configured in part to perform page processing services/features as part of providing difference packages including page incremental rendering information for navigation operations between various electronic pages, as described below.

In one embodiment, the minimal download features 106 activate as part of a minimal download strategy during a page navigation operation when the server 102 determines that a minimal download page transition process is to be used. The minimal download features 106 can operate to build a layer of indirection between page script and a window object, document object, and/or form object of a page and thereby control events/notifications and lifetime of any associated hooks. The layer of indirection provides for controlled execution of various browser code for execution during page navigation simulation. In an embodiment, when a page is navigated away from, the minimal download features 106 disconnect the page objects from the window, document and form objects, and prepare to render a new or target electronic page resulting from a user interaction (e.g., enters a URL, clicks a URL, etc.).

A failover process can be used to enable the client 104 to perform a normal navigation operation, such as by downloading page components used to render the page locally at the client 104 absent using the minimal download features 106 and/or page incremental rendering information. The server 102 is configured to generate and provide packages and/or other substantiations of page differences according to electronic page requests issued from clients when minimal download features are used. For example, a user can use a browser type application to communicate with the server 102 and request an electronic page as part of a page navigation operation, where the server 102 can provide a difference package including page incremental rendering information corresponding to changed aspects of a requested page for use by the client 104.

The server 102 can process the request and determine whether to direct the client 104 to a failover process and normal page navigation procedures, or provide a server-generated difference package to process locally at the client 104 as part of a page transition operation. For example, the client 104 can be incorporated into a user computer device as part of a browser type user interface (UI) component that enables a user to interact with and access electronic pages based in part on aspects of a transmitted uniform resource locator (URL), wherein the server 102 can process or examine each transmitted URL and determine whether to implement normal page navigation operations or minimal download operations as the user navigates between electronic pages.

The server 102 of an embodiment can be configured to generate each difference package based in part on differences between aspects of a new or target page (e.g., determined by a URL input (e.g., clicked/selected URL)) and aspects of a current or previously rendered page. For example, the server 102 can examine a URL associated with a page request to determine if the requested page is part of a class of electronic pages. If the requested page is configured for applying page incremental rendering information (e.g., based on a collaboration master template or page of a family of electronic pages), the server 102 can provide differences between the new page and reference page to provide the page incremental rendering and any other information for use by the client 104 in rendering the new page. The server 102 of one embodiment operates to generate page difference information that includes one or more of a page script set, a page style sheet set, and/or markup and other differences (e.g., hypertext markup language (HTML) and asynchronous JAVASCRIPT and extensible markup language (XML), hidden input fields, form action, etc.), as described further below.

It will be appreciated that other user devices/systems can be included that couple, communicate, and/or interact with one or more components of the environment 100 as part of providing page navigation features and functionality. Each server can include one or multiple physical serving machines, including co-location, remote-location, and/or distributed architectures. End-users can use different interactive applications, including browser-type applications such as those used with smartphones, laptop computers, tablet computers, desktop computers, and/or other computer/communication interfaces, to access features of the environment 100. For example, an enterprise user can use a browser or other application to create and/or access a SHAREPOINT worksite using a browser-type interface. In an embodiment, a user can use a browser application or interface to leverage the features and functionality of the exemplary computing environment 100, including existing and/or future standards, cross-browser compatible markup, etc.

Figure 2:
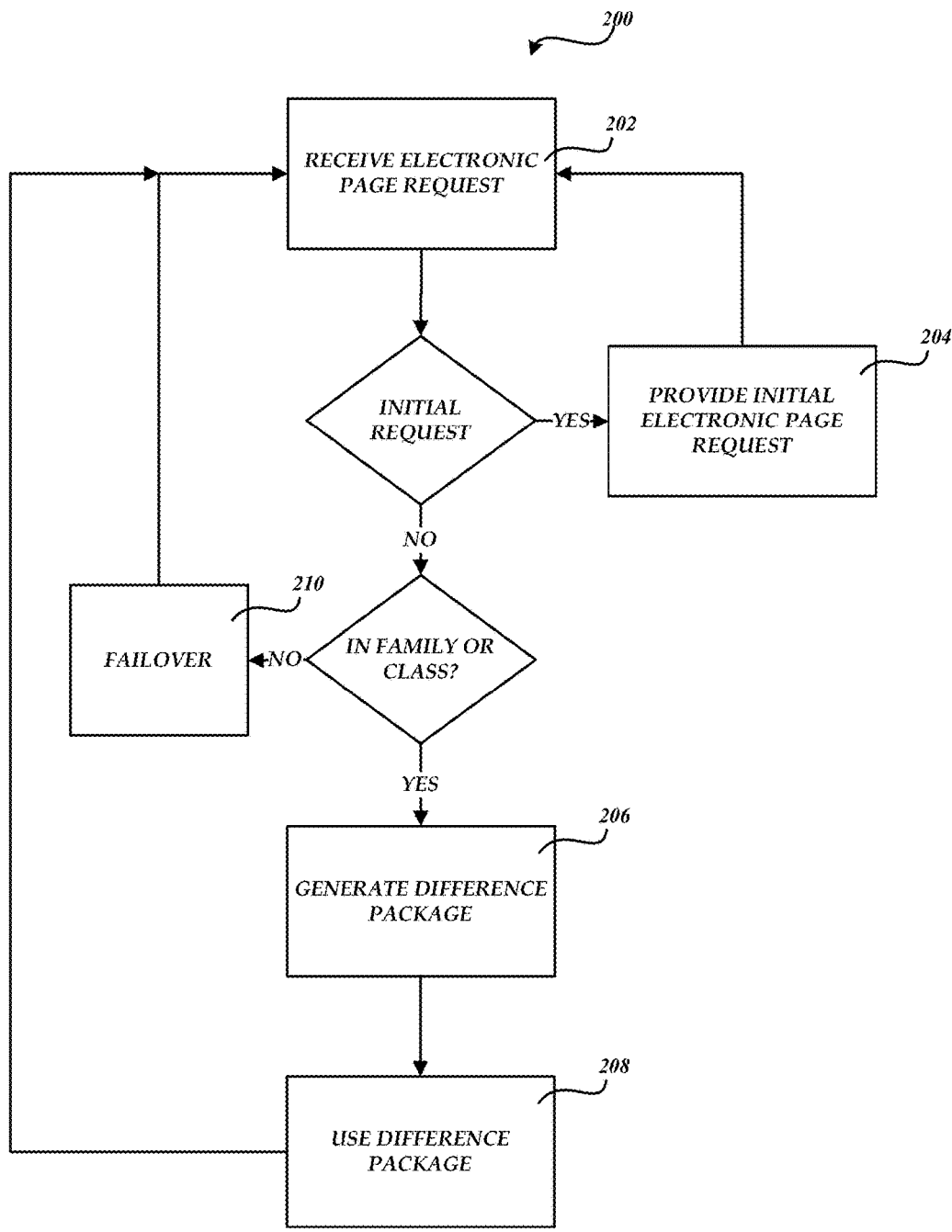
FIG. 2 is a flow diagram illustrating an exemplary page navigation process.

FIG. 2 is a flow diagram illustrating an exemplary page navigation process 200, but is not so limited. It will be appreciated that FIG. 2 provides a broad description of a page navigation process to process electronic page requests when browsing electronic pages. At 202, the process 200 begins as part of receiving a request for an electronic page. For example, a user can use a browser-type application to submit a URL request to a dedicated server for a particular web page.

If the request is an initial page request, the process 200 at 204 provides the electronic page associated with the initial request including any relevant script, style, and/or markup information. If the request is not an initial page request and the requested page is of the same page class or family, the process 200 at 206 generates a difference package that includes incremental rendering information associated with a currently used electronic page (e.g., in focus) and a target electronic page associated with the page request.

In an embodiment, the process 200 at 206 operates to generate a difference package that includes differences between a requested or target electronic page and a different version of the requested page taking into account global page scripts, submit scripts, script references, inline style information and/or references, markup, markup differences, etc. Differences can be packaged into the difference package and communicated to a requesting client for local application. For example, new inline script, script file references, style changes, etc. can be included in the difference package or file and thereafter applied locally as part of rendering a new electronic page.

At 208, the process 200 uses the generated difference package to render the requested electronic page for the user. In one embodiment, the process 200 at 208 uses aspects of a minimal download component to update a window object locally using the difference package (e.g., page script set, page style set, HTML, etc.). For example, a client computing device can use encoded navigation features to process a difference package as part of building a state of a window object using variables associated with a template or master page along with incremental rendering information provided in the difference package to render the new page including firing page load events, executing script, etc. In one embodiment, JAVASCRIPT run time can be based on properties of the windows object.

It will be appreciated that processing, networking, and/or other features can assist in providing page navigation features and interfaces. Aspects of the process 200 can be distributed to and among other components of a computing architecture, and client, server, and other examples and embodiments are not intended to limit features described herein. While a certain number and order of operations is described for the exemplary flow of FIG. 2, it will be appreciated that other numbers and/or orders can be used according to desired implementations.

Figure 3A:
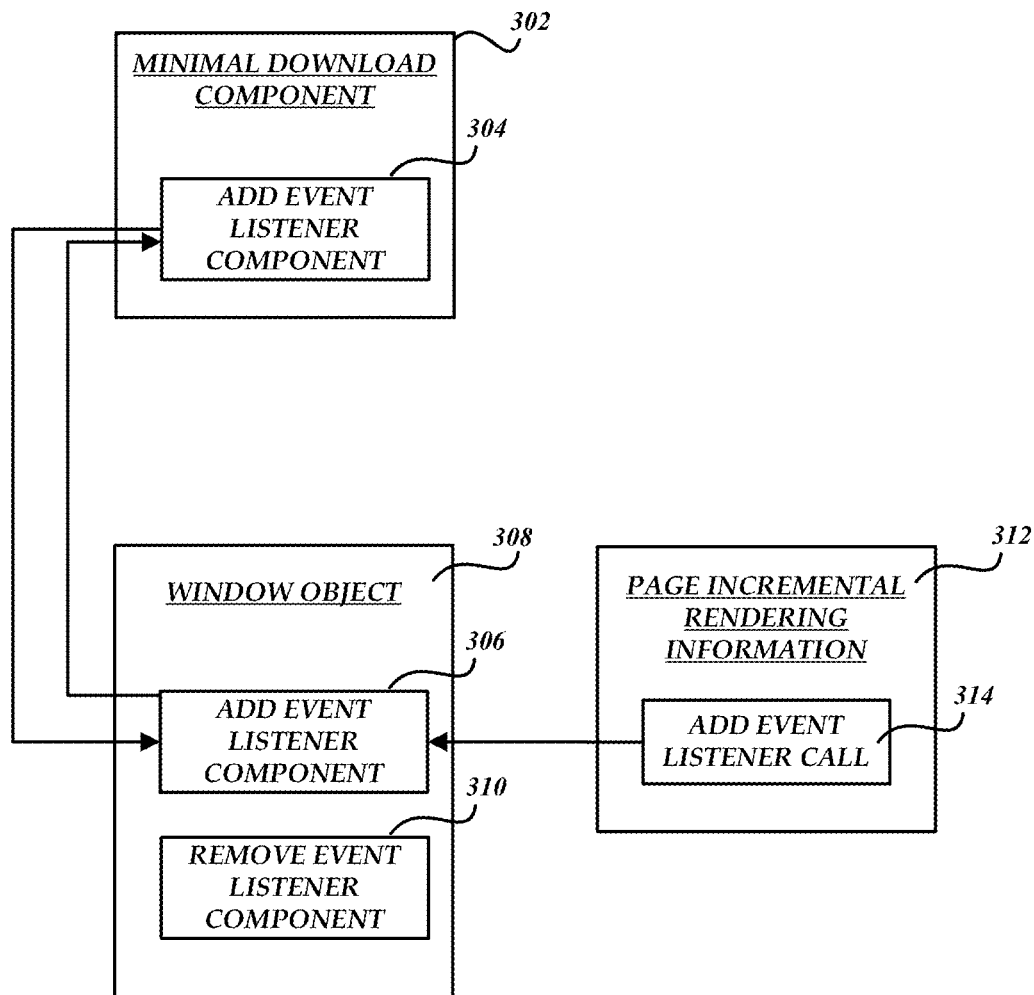
FIGS. 3A-3C are functional block diagrams that depict aspects of an exemplary minimal download computing architecture.
Figure 3B:
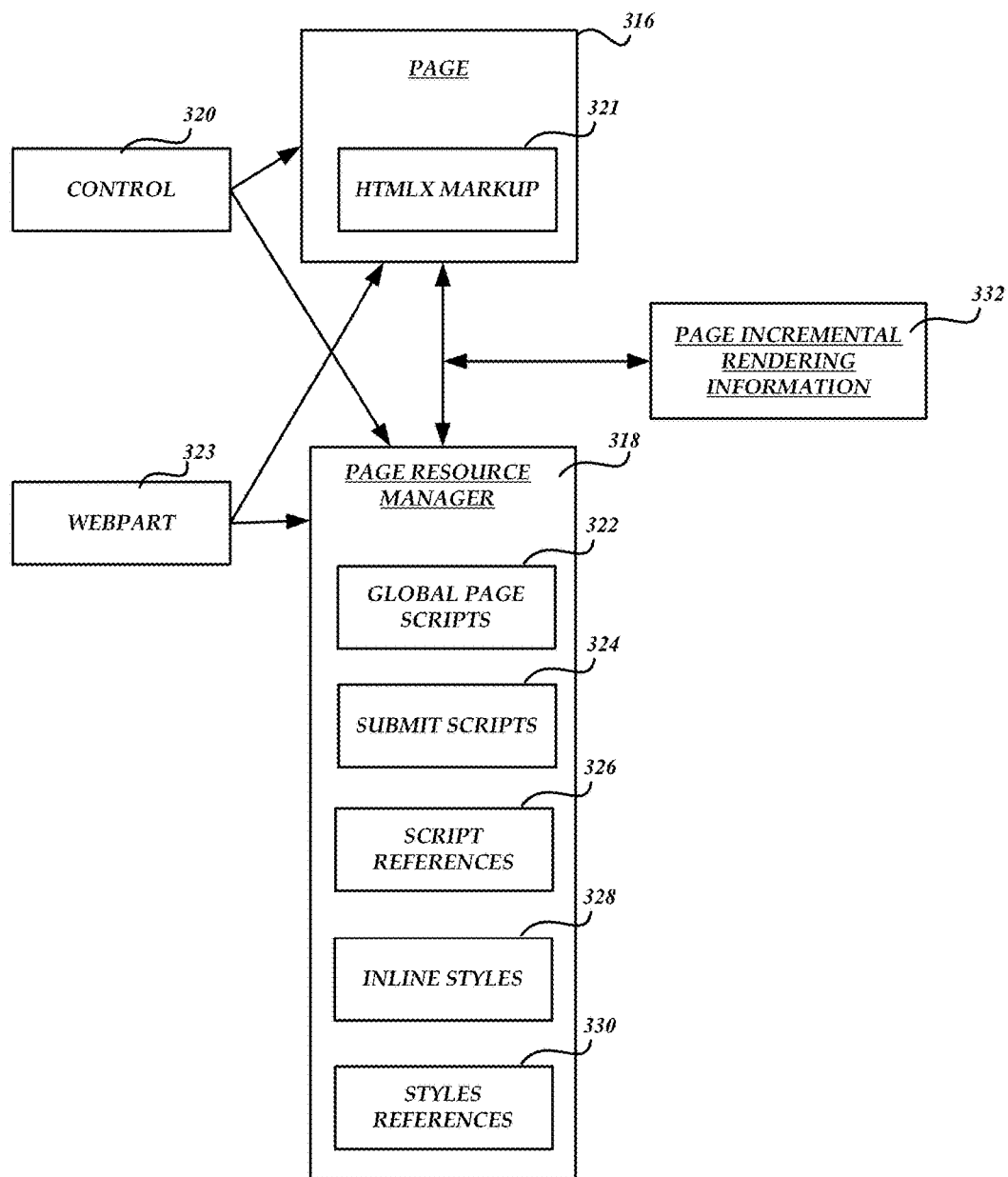
Figure 3C:
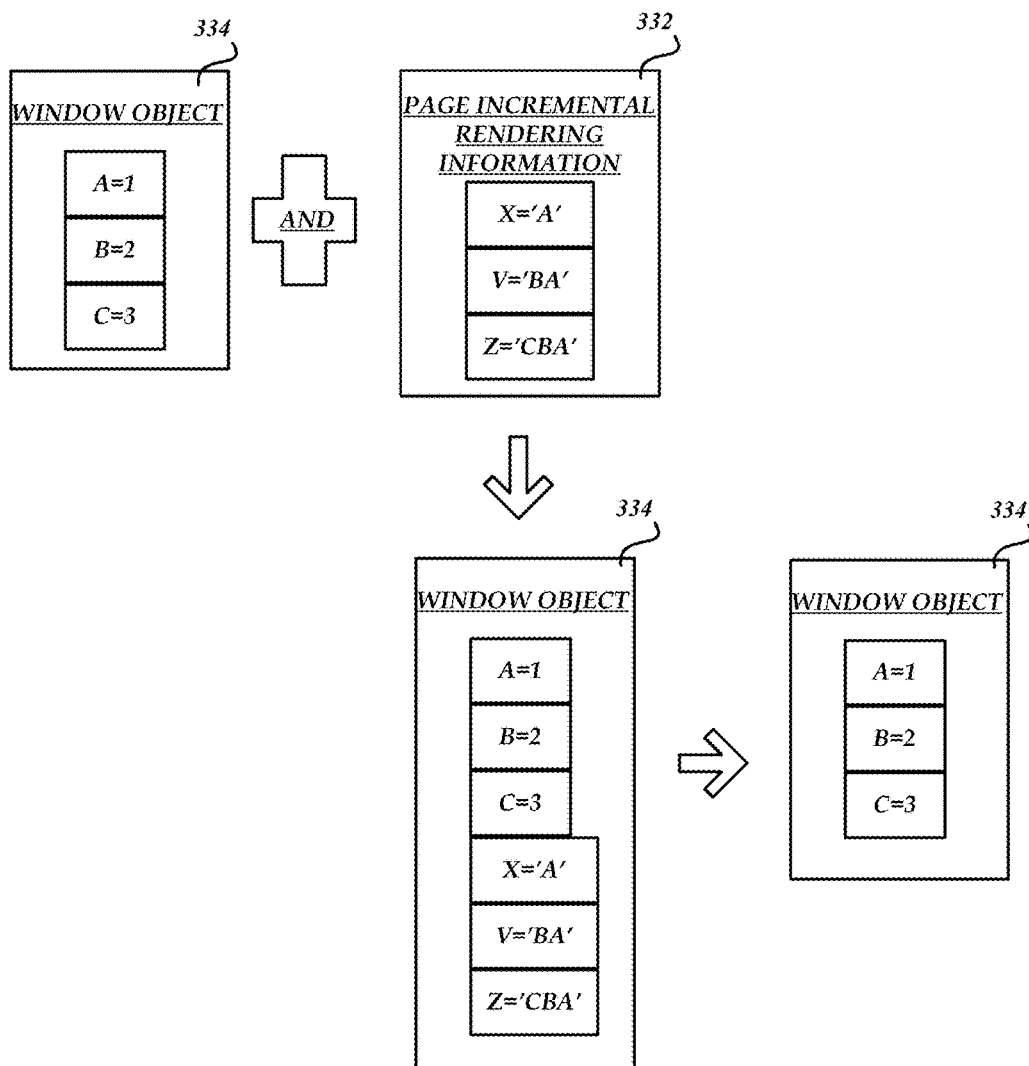

FIGS. 3A-3C are functional block diagrams that depict aspects of an exemplary minimal download server computing architecture configured in part to use page difference information as part of providing a page navigation strategy. For example, the computing architecture can enable users to access and interact with features of a collaboration environment (e.g., MICROSOFT SHAREPOINT programs and services) including using a minimal download process or strategy to provide efficient and resource-friendly page browsing operations.

FIG. 3A depicts a minimal download component 302 of the computing architecture that includes an add event listener component 304 that interacts with an add event listener component 306 of a window object 308 that also includes a remove event listener component 310. The exemplary computing architecture also includes page incremental rendering information 312 that includes an add event listener call 314 to call the add event listener component 306 of the window object 308. The minimal download component 302 of an embodiment operates in part by providing a layer of indirection between the page script and the window object, document object, and/or form object of a page to control events/notifications and any hook lifetime(s) parameters associated therewith.

When a user navigates away from a page, the minimal download component 302 of an embodiment operates to disconnect page objects from the window object, document object, and form object in preparing to render a new page. When a script calls the add event listener component 306, the script can also call the remove event listener component 310 to remove an associated hook when the notifications are no longer needed. Since normal navigation behavior does not require a call to a remove function, the minimal download component 302 of one embodiment operates to remove the remove event listener component 310 when navigating to a new page. The minimal download component 302 provides a type of handling for other application programming interfaces (APIs) (e.g., setTimeout/clearTimeout, setInterval/clearInterval, etc.). In an embodiment, a plurality of APIs are used to gather page incremental rendering information for use in generating a new electronic page as part of navigating away from a currently rendered page.

FIG. 3B depicts a page 316 and a page resource manager 318, and the control 320 and webpart portions 320 and 323 that provide inputs for the page 316 and page resource manager 318 to define page features and functionality. As shown, the page 316 includes markup portions 321 (e.g., HTMLx encoding using a set of libraries to provide JAVASCRIPT programmability at a server), and the page resource manager 318 includes global page scripts 322, submit scripts 324, script references 326, inline styles 328 (e.g., inline CSS styles), and styles references 330 (e.g., CSS styles references).

The exemplary computing architecture uses a set of application programming interfaces (APIs) to build either the regular HTMLx page or page incremental rendering information 332 (e.g., difference package including page differences between a new page and a baseline or reference page (e.g., master family template)). For example, the APIs can be configured to separate and/or identify the page HTMLx markup from resources such as JAVASCRIPT, CSS declarations, etc. HTMLx markup can reference the JAVASCRIPT and CSS declarations.

A minimal download page navigation request can determine whether to render a new page incrementally using page incremental rendering information 332 or render the new page using a default rendering procedure. For example, a server can examine a request to determine whether to provide a difference package including the page incremental rendering information 332 for use in rendering a new page and without having to re-communicate, re-execute, and/or re-apply common portions (e.g., script, styles, etc.) associated with a new page and a prior or reference page (e.g., a master page). For example, a new page can be rendered absent having to re-download, re-compile, and/or re-apply common portions of a master template and a previously rendered page that is related to or associated with the master template.

FIG. 3C depicts building of state of a window object 334. As shown, the exemplary window object 334 includes three variables (a,b,c) included as part of a template or master page and preserved (a,b,c) through the master page lifetime as constants. Properties specific to a page are retrieved from the page incremental rendering information 332 and inserted in the window object 334. At the end of the page lifetime, garbage collection and property cleaning operations can be used for added properties for the current page.

Figure 4:
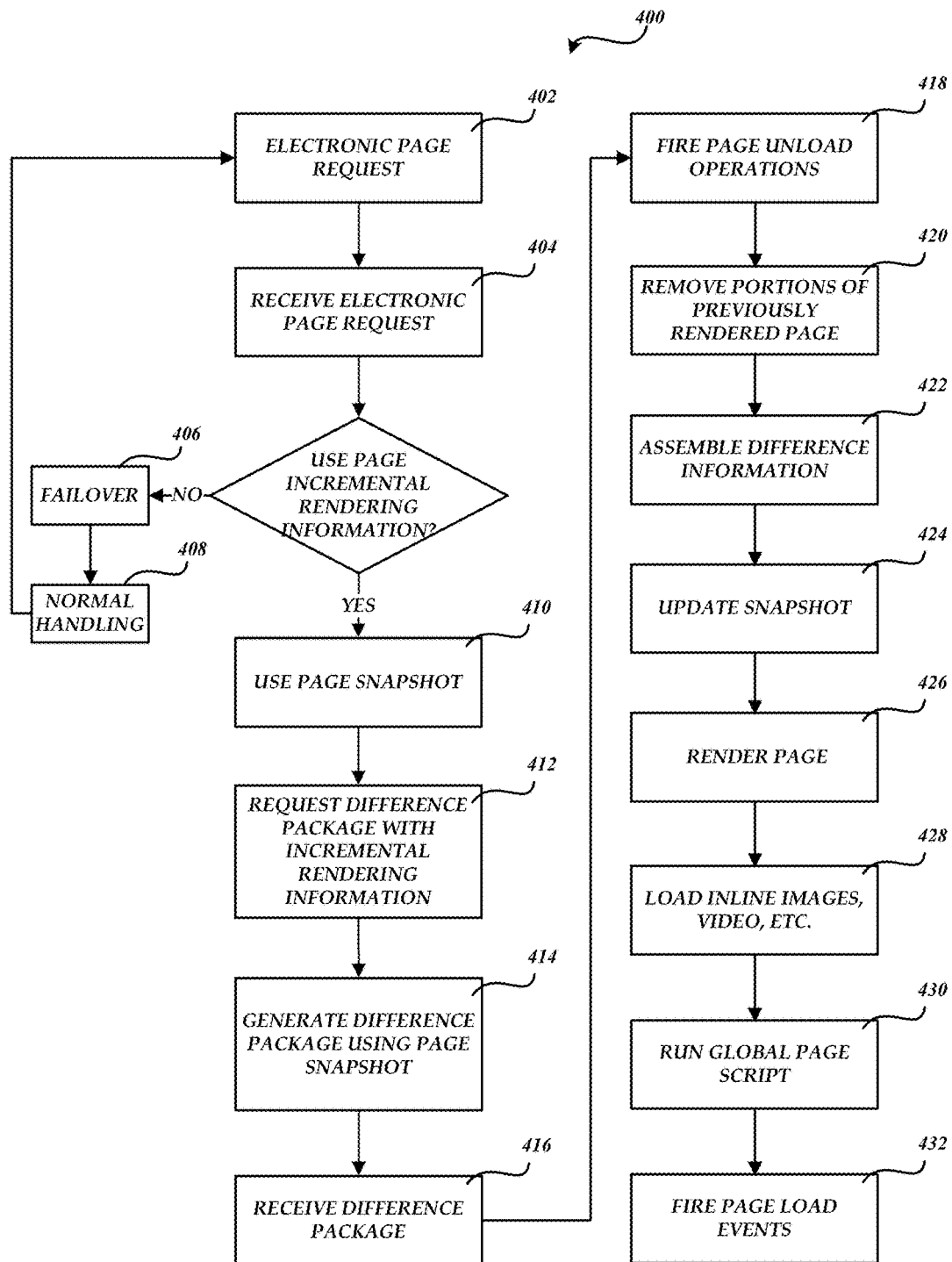
FIG. 4 is a flow diagram illustrating an exemplary page navigation process.

FIG. 4 is a flow diagram illustrating an exemplary page navigation process 400 in the context of a client-server computer environment, but is not so limited. At 402, a client transmits a page request to a server. For example, a browser type application for example can be used to transmit a page request after a user clicks a link on a page or enters a page address. A client of an embodiment can also request content based in part on a fragment (e.g., hash) portion of a URL and determine the URL to the desired page content (e.g., "contentURL"), add query string parameters to "contentURL" to denote that this request is a "content" request, and to communicate a compatible master page for the request, and/or request "contentURL" from the server.

At 404, the server receives and processes the page request. The server of an embodiment can be configured to include an initial request handler that identifies a site that corresponds with the request and determines if a site enables page transitions using page incremental rendering information. For example, a "Minimal Download" property can be set to either redirect to start.aspx+the content represented by an original URL, or serve the requested or new page. Thus, according to an embodiment, based in part on the request processing, it is determined whether page incremental rendering information is to be used to render a new page.

If page incremental rendering information is not to be used, at 406 a failover process is implemented to provide normal URL handling operations at 408, and then the process 400 returns to 402. For example, the server can use information associated with page request (e.g., URL) to determine if the requested page is within a page family or satisfies some other associative criteria such that page incremental rendering information can be used to provide a minimal download page transition process as the user navigates from one page to another page, including backward and forward page navigation operations. Failover can include use of normal or default browser code as one example or, as another example, the client may need to refresh a master page and then proceed with minimal download navigation operations.

If page incremental rendering information is to be used (e.g., requested page can be incrementally rendered), at 410 the process 400 uses a page snapshot as part of identifying differences and/or managing snapshot updates. It will be appreciated that a page snapshot can be taken upon or after initially rendering a page and/or updated and/or saved at different intervals or times. A page snapshot can include runtime code such as JAVASCRIPT runtime code for example and can be used as a reference when generating and applying page incremental rendering information. At 412, the client requests a difference package that includes page incremental rendering information from the server.

At 414, the server of an embodiment generates the difference package using the page snapshot to generate one or more of a page script set, styles set, markup, and/or other information that comprises page incremental rendering information. In an embodiment, the server can operate for an entire page to create: an array of the scripts registered by all controls, an array of styles registered by all controls, and/or an array of hidden input fields registered by all controls. As part of such an embodiment, the server can be configured to generate page incremental rendering information by creating and storing a string representation of the rendered contents for portions of a page to be visually updated, package the scripts, styles, input fields, rendered contents, and/or other resources, and/or send the package to a client for processing.

At 416, the client receives the difference package and fires page unload operations at 418. In an embodiment, before firing page unload or other operations, the client can be configured to first check if a JAVASCRIPT variable exists which indicates transition is possible, and then request page changes from the server. At 420, the client removes portions of the previously rendered page, such as specific global variables, styles, and/or markup using the page snapshot. The client of an embodiment can be configured to destroy/remove all the objects (and references) for each "global init" function run on a previous page, and/or remove the style from the global style array for each style added on the previous page that is not required on the new page.

At 422, the client assembles the difference information including script, styles, and/or markup information, and updates the page snapshot at 424. As one example, the client can be configured to: 1) find the corresponding div in a loaded page and set the content of a div element (e.g., div.innerHTML) to the appropriate string to represent each part of the HTML section of the difference package which corresponds to an area to be updated/modified; 2) execute only the "global" function to initialize related global variables if a script file has already been loaded or load an entire script file for each script file to be applied to the new page if the script file has not already been loaded; 3) load an entire style file (e.g., CSS file) to be applied to the page if the style file has not already been loaded for each style file; 4) execute the inline script for the new page; and/or 5) add an inline style to a global style array for each inline style of the new page. In an embodiment, the server can be configured to update and/or maintain page snapshots and/or differences therebetween.

At 426, the client completes the incremental page transition and renders the page, loading inline images, video, etc. at 428. At 430, the client runs the global page script and fires page load events at 432, and returns to 402. It will be appreciated that order of operations can change or individual and/or collectively performed at other times, such as reversing the order of the operations at 428 and 430 as an example.

It will be appreciated that processing, networking, and/or other features can assist in providing page navigation features and interfaces. Aspects of the process 400 can be distributed to and among other components of a computing architecture, and client, server, and other examples and embodiments are not intended to limit features described herein. While a certain number and order of operations is described for the exemplary flow of FIG. 4, it will be appreciated that other numbers and/or orders can be used according to desired implementations.

Figure 5:
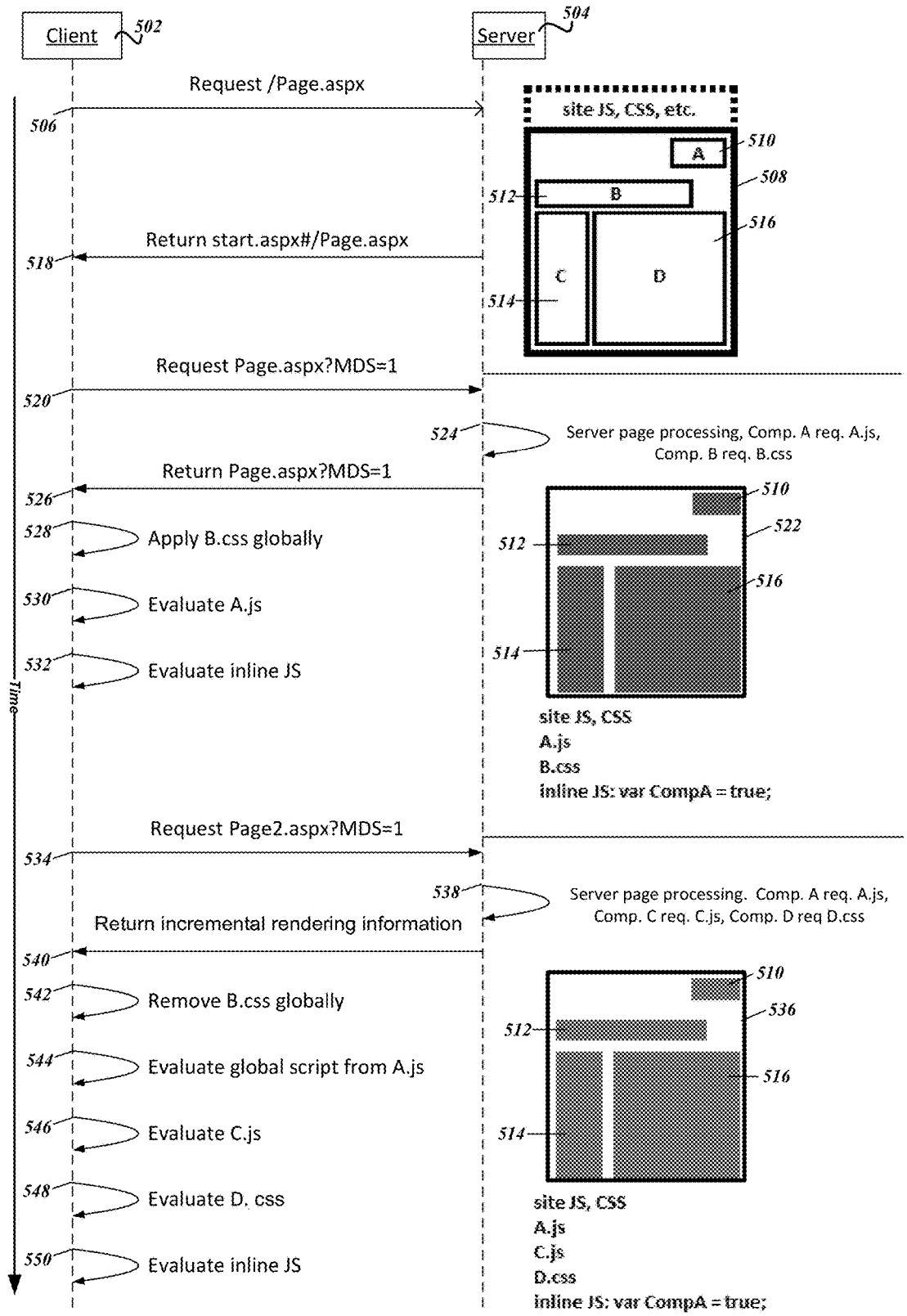
FIG. 5 is a functional diagram depicting client-server communication processing operations as part of providing minimal download functionality.

FIG. 5 is a functional diagram depicting client-server communication processing operations as part of providing minimal download functionality that includes simulated page navigation transition features. As shown in FIG. 5, client 502 issues a request at time 506 to the server 504 for a page 508 that includes four components 510-516, such as page script (e.g., global, inline, etc.), page styles, markup, controls, etc. After receiving the client request, including making any authentications, the server 504 responds at time 518 by returning the start page 508 associated with the request. The client 502 then issues a new request at time 520 to the server 504 for new page 522. At time 524, the server 504 page processing operations determine that component 510 requires a page-specific script file (e.g., A.js), and component 512 requires page-specific style file (e.g., B.css). After receiving the next client request at time 520, the server 504 responds at time 526 by returning the new page 522. Note at this point, page incremental rendering information has not been used as part of the minimal download functionality.

As part of rendering the new page 522, the client 502 applies the page-specific style file (e.g., B.css) globally at time 528, evaluates the page-specific script file (e.g., A.js) at time 530, and evaluates inline script at 532. Apply styles globally of an embodiment includes adding the style file (e.g., B.css) to an array of style files associated with the associated document object model (DOM). Evaluating script of a script file (e.g., A.js) of an embodiment includes creating a script element that references or points to the script file (A.js) and adding the script element to the DOM, wherein all contained script of the script file will be executed. Evaluating global script from a script file (e.g., A.js) of an embodiment includes executing only a global function defined in the script file and initializing all the global variables needed for other code in the script file to function correctly.

The client 502 then issues a new request at time 534 to the server 504 for new page 536. Note at this point, page incremental rendering information is to be used as part of the minimal download functionality since the new page 536 is associated with page 522 (e.g., in the same page template class (MDS=1 of the URL). At time 538, the server 504 page processing operations determine that component 510 requires a previously identified page-specific script file (e.g., A.js), component 514 requires a new page-specific script file (C.js), and component 516 requires a new page-specific style file (e.g., D.css) for the new page 536.

The server 504 responds to the new page request at time 540 by returning a package of encoded information that includes the page incremental rendering information for the new page 536 (C.js and D.css). As part of rendering the new page 536, the client removes B.css globally at time 542, evaluates global script of A.js at time 544, evaluates the new script file (e.g., C.js) at 546, evaluates new style file at 548, and evaluates inline script at 550. Removing styles globally of an embodiment includes removing the associated style file (e.g., B.css) from the array of style files in the DOM.

Figure 6A:
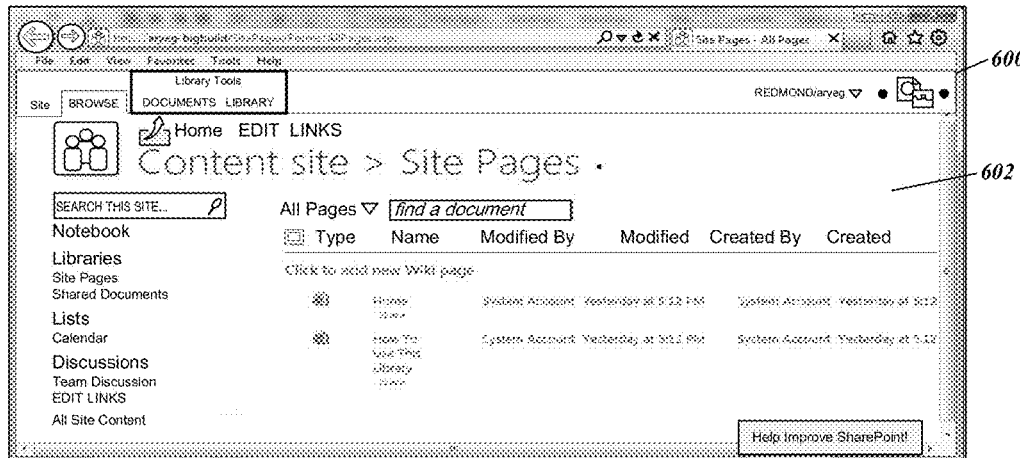
FIGS. 6A-6C depict aspects of an exemplary user interface (UI) while implementing a minimal download process.
Figure 6B:
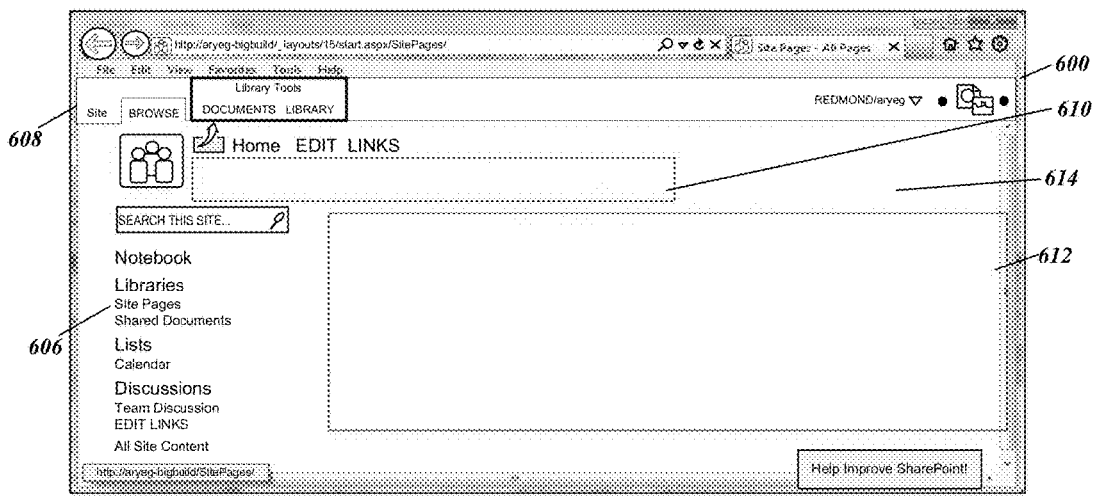
Figure 6C:
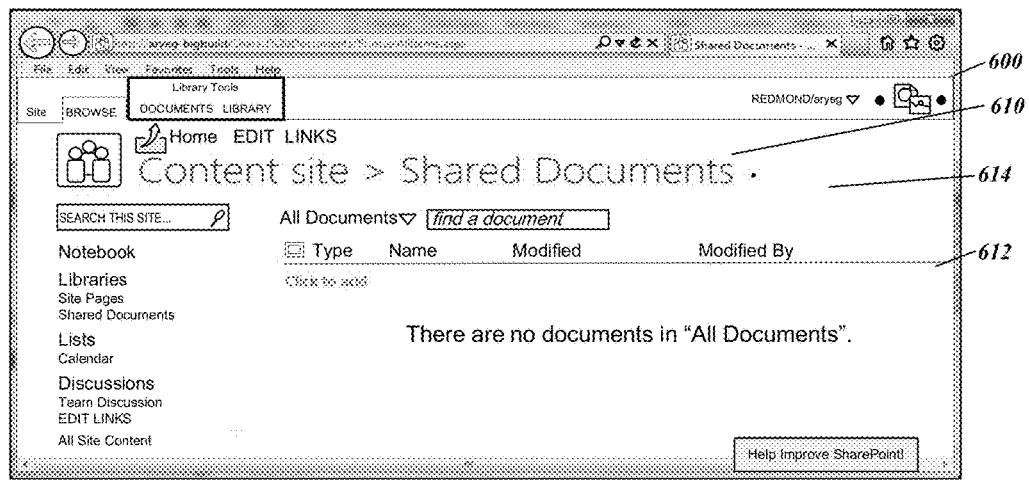

FIGS. 6A-6C depict aspects of an exemplary user interface (UI) 600 while implementing a minimal download strategy including using page incremental rendering information while transitioning between pages.

FIG. 6A depicts the UI 600 after loading a site page 602 by firing page load events and allowing script to execute, etc.

FIG. 6B depicts the UI 600 during a directed animation step/operation as part of responding to a user navigation directive from the site page 602 (e.g., clicked "Shared Documents"). As shown in FIG. 6B, the quick launch menu 606, and the ribbon area 608 are unchanged. Visual effects, including a directed animation, can be constrained to the areas 610 and 612 of the old page 602 that change for the new page 614. The directed animation draws or directs the eye of a user to the changed areas 610 and 612.

FIG. 6C depicts the UI 600 after updating the changed area(s) 610 and 612 with content of the new page 614 (e.g., shared documents page). For this example, not only are the common visuals unchanged, but the vast majority of the shared script and styles between the pages does not have to be re-downloaded and re-parsed. Just as in a normal navigation mode, page load events are fired and script executes, thereby simulating a full page load.

While certain embodiments are described herein, other embodiments are available, and the described embodiments should not be used to limit the claims. Exemplary communication environments for the various embodiments can include the use of secure networks, unsecure networks, hybrid networks, and/or some other network or combination of networks. By way of example, and not limitation, the environment can include wired media such as a wired network or direct-wired connection, and/or wireless media such as acoustic, radio frequency (RF), infrared, and/or other wired and/or wireless media and components. In addition to computing systems, devices, etc., various embodiments can be implemented as a computer process (e.g., a method), an article of manufacture, such as a computer program product or computer readable media, computer readable storage medium, and/or as part of various communication architectures.

Suitable programming means include any means for directing a computer system or device to execute steps of a method, including for example, systems comprised of processing units and arithmetic-logic circuits coupled to computer memory, which systems have the capability of storing in computer memory, which computer memory includes electronic circuits configured to store data and program instructions. An exemplary computer program product is useable with any suitable data processing system. While a certain number and types of components are described, it will be appreciated that other numbers and/or types and/or configurations can be included according to various embodiments. Accordingly, component functionality can be further divided and/or combined with other component functionalities according to desired implementations.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of device.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components include, but are not limited to, wide area networks (WANs), local area networks (LANs), metropolitan area networks (MANs), proprietary networks, backend networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions. Other embodiments and configurations are available.

Exemplary Operating Environment

Figure 7:
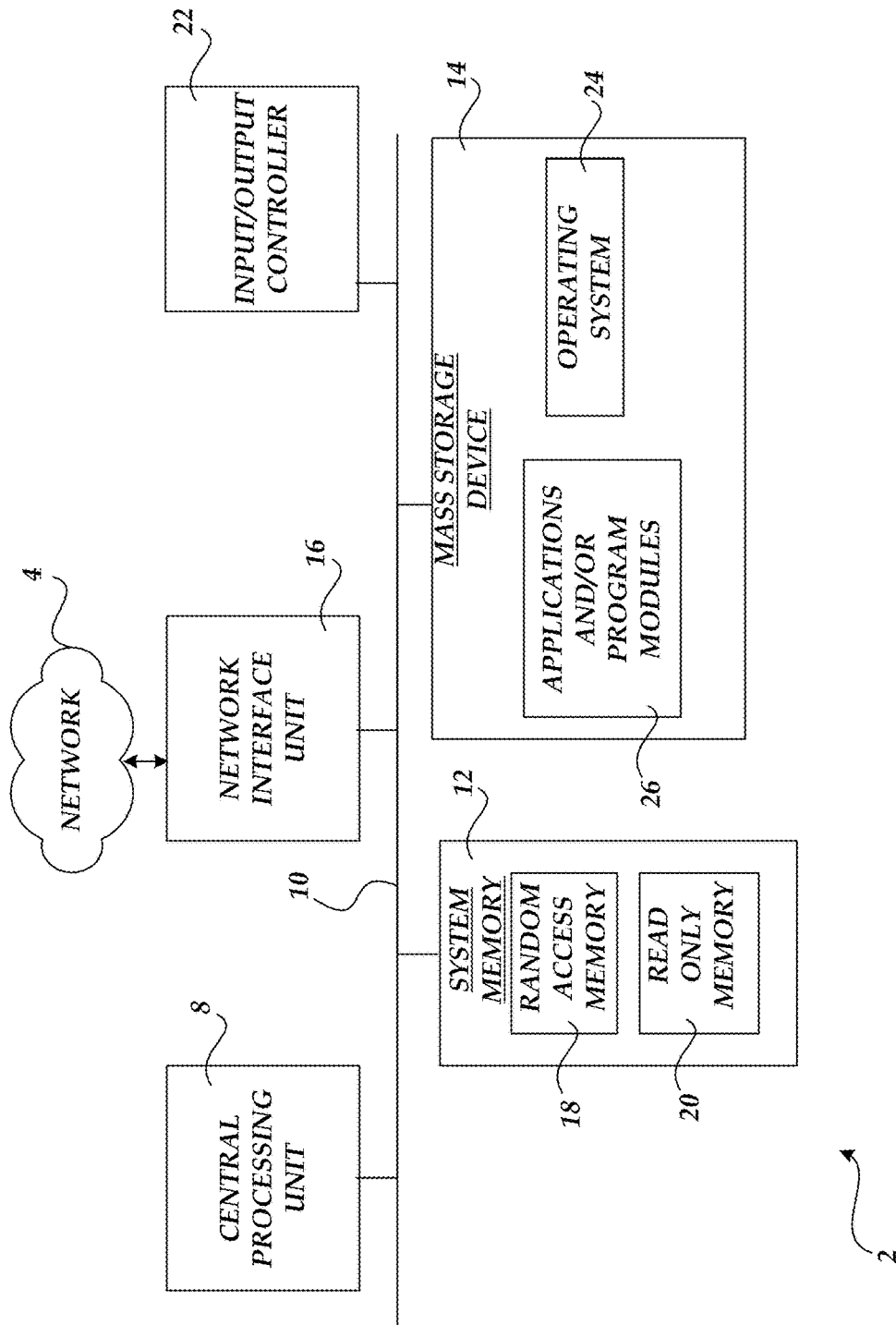
FIG. 7 is a block diagram illustrating an exemplary computing environment for implementation of various embodiments described herein.

Referring now to FIG. 7, the following discussion is intended to provide a brief, general description of a suitable computing environment in which embodiments of the invention may be implemented. While embodiments of the invention will be described in the general context of program modules that execute in conjunction with program modules that run on an operating system on a personal computer, those skilled in the art will recognize that the invention may also be implemented in combination with other types of computer systems, devices, and/or program modules.

Generally, program modules include routines, programs, components, data structures, and other types of structures that perform particular tasks or implement particular abstract data types. Moreover, those skilled in the art will appreciate that the embodiments of the invention may be practiced with other computer system configurations, including handheld devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 7, an illustrative operating environment for embodiments of the invention will be described. As shown in FIG. 7, computer 2 comprises a general purpose server, desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A server computer comprising:
   at least one processor device; and
   a memory, operatively connected to the at least one processor, storing instructions, which when executed, cause the at least one processor device to:
      receive an electronic page request from a user computer, the received electronic page request comprising a request to navigate from a previously rendered electronic page to a target electronic page;
      determine whether to implement a normal page navigation operation or a minimal download operation, wherein the minimal download operation operates to provide a difference package associated with the previously rendered electronic page and the target electronic page;
      provide, to the user computer in response to determining to implement the minimal download operation, a layer of indirection for page scripts and page objects of the previously rendered electronic page, wherein the layer of indirection provides controlled disconnect of events associated with the page scripts and the page objects of the previously rendered electronic page;
      generate the difference package with information associated with differences between the previously rendered electronic page and the target electronic page, wherein the information comprises a representation of rendered contents to be updated on the previously rendered electronic page, the representation comprising an array of input fields associated with the previously rendered electronic page and the target electronic page; and
      provide the difference package to the user computer, wherein the difference package enables the user computer to initiate page load events and execute the page scripts using the layer of indirection, thereby simulating the page load for the target electronic page.

2. The server computer of claim 1, wherein the instructions further cause the at least one processor device to provide the difference package when the target electronic page is associated with an associated electronic page class.

3. The server computer of claim 1, wherein the instructions further cause the at least one processor device to create the array of page scripts registered by all controls, the array of styles registered by all controls, and/or the array of input fields registered by all controls.

4. The server computer of claim 1, wherein the instructions further cause the at least one processor device to generate the difference package based on style changes as compared to a reference page.

5. The server computer of claim 1, wherein the instructions further cause the at least one processor device to generate the difference package based on script changes as compared to a reference page.

6. The server computer of claim 1, wherein the instructions further cause the at least one processor device to use a snapshot of the previously rendered electronic page when determining differences.

7. The server computer of claim 1, wherein the instructions further cause the at least one processor device to identify common portions between the target electronic page and the previously rendered electronic page that are not included in the difference package.

8. The server computer of claim 1, wherein the instructions further cause the at least one processor device to provide the difference package that include page incremental rendering information corresponding to changed aspects of the target electronic page.

9. The server computer of claim 1, wherein the instructions further cause the at least one processor device to build the layer of indirection between the page scripts and a window object, a document object, and a form object.

10. The server computer of claim 9, wherein the instructions further cause the at least one processor device to control events and lifetime of any associated hooks.

11. The server computer of claim 9, wherein the instructions further cause the at least one processor device to disconnect the page objects from the window object, the document object, and the form object.

12. The server computer of claim 1, wherein the instructions further cause the at least one processor device to determine whether to use a failover process as part of navigation operations.

13. A method comprising:
receiving, from a user computer, a request to navigate from a first page to a second page;
determining whether to implement a normal page navigation operation or a minimal download operation, wherein the minimal download operation operates to provide a difference package associated with the first page and the second page;
providing, to the user computer in response to determining to implement the minimal download operation, a layer of indirection for page scripts and page objects of the first page, wherein the layer of indirection provides controlled disconnect of events associated with the page scripts and the page objects from the first page;
generating the difference package between the first page and the second page, the difference package comprising script differences, style differences, and/or other differences between the first page and the second page, wherein the difference package further comprises a representation of rendered contents to be updated on the first page, the representation comprising an array of input fields associated with the first page and the second page; and
providing the difference package to the user computer, wherein the difference package enables the user computer to initiate page load events and execute the page scripts using the layer of indirection, thereby simulating the page load for the target electronic page.

14. The method of claim 13, further comprising providing the difference package as part of a simulated page navigation transition.

15. The method of claim 13, further comprising examining a uniform resource allocator (URL) of the second page to determine that the second page is in a particular class.

16. The method of claim 15, further comprising using a failover process for a page transition if the examining of the URL results in not using page incremental rendering information.

17. The method of claim 13, further comprising using a snapshot of a runtime script based in part on examining window object properties as part of generating the difference package.

18. The method of claim 13, further comprising using an initial request handler to identify a site that corresponds with a request and determine if the site enables page transitions using page incremental rendering information.

19. The method of claim 13, further comprising using information associated with the received request to determine if the second page is associated with a page family that enables page incremental rendering information.

20. The method of claim 13, further comprising creating the string representation of the rendered contents for portions of the first page.

* * * * *